(12) United States Patent
Araki et al.

(10) Patent No.: US 9,139,722 B2
(45) Date of Patent: Sep. 22, 2015

(54) POLYPROPYLENE-BASED RESIN COMPOSITION, MOLDED ARTICLE THEREOF, AND AUTOMOBILE INTERIOR OR EXTERIOR MATERIAL USING THE SAME

(75) Inventors: Yoshifumi Araki, Tokyo (JP); Katsunori Nitta, Tokyo (JP); Takashi Sato, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 0 days.

(21) Appl. No.: 13/254,938

(22) PCT Filed: Mar. 12, 2010

(86) PCT No.: PCT/JP2010/054229
§ 371 (c)(1),
(2), (4) Date: Sep. 6, 2011

(87) PCT Pub. No.: WO2010/104174
PCT Pub. Date: Sep. 16, 2010

(65) Prior Publication Data
US 2012/0010351 A1 Jan. 12, 2012

(30) Foreign Application Priority Data

Mar. 12, 2009 (JP) ................................. 2009-059646

(51) Int. Cl.
| | | |
|---|---|---|
| C08L 53/02 | (2006.01) |
| C08L 23/10 | (2006.01) |
| C08L 23/12 | (2006.01) |
| C08L 23/08 | (2006.01) |
| C08L 23/16 | (2006.01) |
| C08C 19/02 | (2006.01) |
| C08K 3/34 | (2006.01) |
| C08L 15/00 | (2006.01) |

(52) U.S. Cl.
CPC .................. C08L 23/10 (2013.01); C08L 23/16 (2013.01); *C08C 19/02* (2013.01); *C08K 3/346* (2013.01); *C08L 15/00* (2013.01); *C08L 23/08* (2013.01); *C08L 53/02* (2013.01); *C08L 53/025* (2013.01)

(58) Field of Classification Search
CPC ....... C08L 23/10; C08L 23/16; C08L 266/04; C08L 53/02; C08L 15/00; C08L 23/08; C08L 23/0815; C08C 19/02; C08K 3/346
USPC .............. 524/525, 526; 525/88, 98, 232, 240, 525/236
See application file for complete search history.

(56) References Cited

U.S. PATENT DOCUMENTS

| | | |
|---|---|---|
| 3,281,383 A | 10/1966 | Zelinski et al. |
| 3,333,024 A | 7/1967 | Haefele et al |
| 4,501,857 A | 2/1985 | Kishimoto et al. |
| 4,603,155 A | 7/1986 | Muramori et al. |
| 4,673,714 A | 6/1987 | Kishimoto et al. |
| 5,750,612 A | 5/1998 | Zyagawa et al. |
| 6,239,218 B1 | 5/2001 | Yonezawa et al. |
| 6,310,138 B1 * | 10/2001 | Yonezawa et al. ............... 525/88 |
| 2006/0276592 A1 * | 12/2006 | Kanae et al. .................. 525/236 |
| 2011/0129682 A1 * | 6/2011 | Kurata et al. ................. 428/500 |

FOREIGN PATENT DOCUMENTS

| | | |
|---|---|---|
| CA | 1034289 | 1/1973 |
| DE | 197 52 658 | 6/1998 |
| EP | 1 022 292 A2 * | 1/2000 |
| EP | 1022292 * | 7/2000 |
| GB | 1020720 A | 2/1966 |
| JP | 36-19286 | 10/1961 |
| JP | 42-8704 | 4/1967 |
| JP | 43-6636 | 3/1968 |
| JP | 43-17979 | 7/1968 |
| JP | 46-32415 | 9/1971 |
| JP | 48-2423 | 1/1973 |
| JP | 48-4106 | 2/1973 |
| JP | 49-36957 | 10/1974 |
| JP | 56-28925 | 7/1981 |
| JP | 59-166518 | 9/1984 |
| JP | 60-186577 | 9/1985 |
| JP | 61-033132/1-53851 | 2/1986 |
| JP | 62-207303/2-9041 | 9/1987 |
| JP | 63-4841 | 7/1988 |
| JP | 1-37970 | 8/1989 |
| JP | 8-20684 | 1/1996 |
| JP | 2513962 | 4/1996 |

(Continued)

OTHER PUBLICATIONS

WO 2009/020130; Kurata et al. ; Laser-sinterable Powder; Feb. 2009.*
JP2001/106844; Kiyoo et al. ; Propylene Based Resin Composition; Apr. 2001.*
Kolthoff et al., "Determination of Polystyrene in GR-S Rubber", J. Polymer Sci., vol. 1, 1946, pp. 429-433.
Search report from International Application No. PCT/JP2010/054229, mail date is Jun. 22, 2010.
International Preliminary Report on Patentability for PCT/JP2010/054229, mailed Oct. 18, 2011.
Office Action issued with respect to German Application No. 112010001144.3, mail date is Sep. 19, 2013.

*Primary Examiner* — Liam J Heincer
(74) *Attorney, Agent, or Firm* — Greenblum & Bernstein, P.L.C.

(57) ABSTRACT

There are provided a polypropylene-based resin composition having excellent impact resistance, tensile elongation at break and rigidity, a molded article thereof, and an automobile interior or exterior material using the same. The polypropylene-based resin composition contains 50 to 90% by mass of a polypropylene-based polymer (A), 5 to 50% by mass of an ethylene-α-olefin copolymer rubber (B), and 0.1 to 5% by mass of a copolymer (C) primarily comprising a vinyl aromatic monomer unit and an alkylene monomer unit, wherein a content of an α-olefin monomer unit in all alkylene monomers is 45 mol % or more.

12 Claims, No Drawings

(56) References Cited

FOREIGN PATENT DOCUMENTS

| | | | |
|---|---|---|---|
| JP | 11-179865 | | 7/1999 |
| JP | 11-236425 | | 8/1999 |
| JP | 2000-143889 | * | 5/2000 |
| JP | 2001-106844 | * | 4/2001 |
| JP | 2001/106844 | * | 4/2001 |
| JP | 2001-172335 | | 6/2001 |
| JP | 2001-240638 | | 9/2001 |
| JP | 3464004 | | 8/2003 |
| WO | WO 2009/020130 | * | 2/2009 |

* cited by examiner

POLYPROPYLENE-BASED RESIN COMPOSITION, MOLDED ARTICLE THEREOF, AND AUTOMOBILE INTERIOR OR EXTERIOR MATERIAL USING THE SAME

TECHNICAL FIELD

The present invention relates to a polypropylene-based resin composition, a molded article thereof, and an automobile interior or exterior material using the same.

BACKGROUND ART

Since a polypropylene-based resin composition generally has excellent chemical resistance and mechanical characteristics, the polypropylene-based resin composition is widely used as materials for various products such as machine parts and automobile parts. Recently, the pursuit of the functionality and economic efficiency of the various products advances enlargement and reduction in wall thickness of the product. A polypropylene-based resin composition having excellent impact resistance, rigidity, and tensile elongation at break is demanded.

Patent Document 1 discloses a polypropylene-based resin composition containing crystalline propylene, a hydrogenated block copolymer containing two conjugated diene compounds and vinyl aromatic compounds having different vinyl aromatic compound contents, and talc.

Patent Document 2 discloses a polypropylene-based resin composition consisting of a polyolefin-based resin, and two hydrogenated block copolymers containing a conjugated diene compound and a vinyl aromatic compound, wherein conjugated diene vinyl bond contents before hydrogenation, of the two hydrogenated block copolymers are 20 mol % or more and less than 40 mol %, and 40 mol % or more and 60 mol % or less.

Patent Document 3 discloses a polypropylene-based resin composition containing a polypropylene-based resin, a hydrogenated block copolymer containing a butadiene compound and a vinyl aromatic compound, an ethylene-α-olefin copolymer rubber, and an inorganic filler, wherein a 1,2-vinyl bond content in butadiene before hydrogenation of the hydrogenated block copolymer is more than 40 mol % and less than 60 mol %.

Patent Document 4 discloses a composition containing a polyolefin resin and a hydrogenated block copolymer containing two conjugated diene compounds and vinyl aromatic compounds having different vinyl contents, wherein the hydrogenated block copolymer having a high vinyl content is in the range of 10 to 20% by mass.

Patent Document 1: Japanese Patent Laid-Open No. 08-20684
Patent Document 2: Japanese Patent Publication No. 2513962
Patent Document 3: Japanese Patent Publication No. 3464004
Patent Document 4: Japanese Patent Laid-Open No. 2000-143889

SUMMARY OF THE INVENTION

Problems to be Solved by the Invention

However, excellent impact resistance, tensile elongation at break and rigidity are further required for the polypropylene-based resin composition for reduction in wall thickness in order to particularly pursue economic efficiency and weight saving. However, impact resistance, tensile elongation at break and rigidity are in mutual contradiction. When any one of impact resistance, tensile elongation at break and rigidity is improved, the other characteristics are reduced. A technique of further enhancing the total balance of physical properties is desired.

The present invention has been accomplished in view of the above-mentioned situation. It is a main object of the present invention to provide a polypropylene-based resin composition having excellent impact resistance, tensile elongation at break and rigidity, a molded article thereof, and an automobile interior or exterior material using the same.

Means for Solving the Problems

The present inventors have diligently studied in order to solve the above-mentioned problems. As a result, the inventors have found that the problems can be solved by a composition containing: 50 to 90% by mass of a polypropylene-based polymer (A); 5 to 50% by mass of an ethylene-α-olefin copolymer rubber (B); and 0.1 to 5% by mass of a copolymer (C) primarily comprising a vinyl aromatic monomer unit and an alkylene monomer unit, wherein a content of an α-olefin monomer unit in all alkylene monomers is 45 mol % or more, thus they have accomplished the present invention.

Specifically, the present invention will be described below.

[1]
A polypropylene-based resin composition comprising:
50 to 90% by mass of a polypropylene-based polymer (A);
5 to 50% by mass of an ethylene-α-olefin copolymer rubber (B); and
0.1 to 5% by mass of a copolymer (C) primarily comprising a vinyl aromatic monomer unit and an alkylene monomer unit, wherein a content of an α-olefin monomer unit in all alkylene monomers is 45 mol % or more.

[2]
The polypropylene-based resin composition according to the item [1], wherein the (C) component is a hydrogenated copolymer primarily comprising a vinyl aromatic monomer unit and a conjugated diene monomer unit; and an average vinyl bond content in all conjugated diene units contained before hydrogenation is 62 mol % or more.

[3]
The polypropylene-based resin composition according to the item [1] or [2], wherein a mass ratio ((C)/(B)) of the (C) component to the (B) component is 1/2 or less.

[4]
The polypropylene-based resin composition according to the item [2] or [3], wherein the (C) component contains at least two or more polymer blocks primarily comprising a vinyl aromatic monomer unit; and an average vinyl bond content in all conjugated diene monomer units contained before hydrogenation is 67 mol % or more.

[5]
The polypropylene-based resin composition according to the item [4], wherein 75 mol % or more of all unsaturated groups contained in the conjugated diene monomer unit before hydrogenation in the (C) component are hydrogenated.

[6]
The polypropylene-based resin composition according to any one of the items [1] to [5], wherein a peak temperature of tan δ obtained from viscoelastic measurement of the (B) component is in a range of −60° C. or more and −30° C. or less.

[7]

The polypropylene-based resin composition according to any one of the items [1] to [6], further comprising 2 to 30% by mass of a copolymer (D) primarily comprising a vinyl aromatic monomer unit and an alkylene monomer unit, wherein a content of an α-olefin monomer unit in all alkylene monomers of the component (D) is less than 45 mol %.

The polypropylene-based resin composition according to the item [7], wherein the (D) component is a hydrogenated copolymer primarily comprising a vinyl aromatic monomer unit and a conjugated diene monomer unit; and an average vinyl bond content in all conjugated diene monomer units contained before hydrogenation is less than 62 mol %.

[9]

The polypropylene-based resin composition according to the item [7] or [8], wherein a mass ratio ((C)/(D)) of the (C) component to the (D) component is 1/2 or less.

[10]

The polypropylene-based resin composition according to any one of the items [1] to [9], wherein the (D) component is a copolymer primarily comprising a vinyl aromatic monomer unit and an alkylene monomer unit; and a content of an α-olefin monomer unit in all alkylene monomers of the component (D) is 21 mol % or more and less than 45 mol %.

[11]

The polypropylene-based resin composition according to the item [10], wherein the (D) component contains at least two polymer blocks primarily comprising a vinyl aromatic monomer unit; and an average vinyl bond content in the conjugated diene monomer unit contained before hydrogenation is from 35 to 60 mol %.

[12]

The polypropylene-based resin composition according to any one of the items [1] to [11], further comprising 5 to 30% by mass of an inorganic filler (E).

[13]

The polypropylene-based resin composition according to any one of the items [1] to [12], wherein the (A) component forms a continuous phase; the (B) component is present as a disperse phase (a first disperse phase) in the continuous phase; and the (C) component and/or the (D) component is dispersed on an interface between the continuous phase and the first disperse phase.

[14]

A molded article comprising a polypropylene-based resin composition according to any one of the items [1] to [13].

[15]

An automobile interior or exterior material comprising a molded article according to the item [14].

Advantageous Effects of the Invention

The present invention can provide a polypropylene-based resin composition having excellent impact resistance, tensile elongation at break and rigidity, a molded article thereof, and an automobile interior or exterior material using the same.

MODES FOR CARRYING OUT THE INVENTION

Hereinafter, the embodiment of the present invention (hereinafter, merely referred to as "the present embodiment") will be described in detail.

The following present embodiment is exemplified in order to describe the present invention, and the present invention is not purported to be limited to the following contents. The present invention can be implemented by appropriately modifying it within the scope thereof.

A polypropylene-based resin composition according to the present embodiment contains 50 to 90% by mass of a polypropylene-based polymer (A); 5 to 50% by mass of an ethylene-α-olefin copolymer rubber (B); and 0.1 to 5% by mass of a copolymer (C) primarily comprising a vinyl aromatic monomer unit and an alkylene monomer unit, wherein a content of an α-olefin monomer unit in all alkylene monomers is 45 mol % or more.

<(A) Component>

The composition and physical properties or the like of the polypropylene-based polymer (A) are not particularly limited. Known polypropylene-based polymers can be used. Examples of the polypropylene-based polymer (A) may include an isotactic highly crystalline polypropylene resin, and a syndiotactic or atactic polypropylene resin. Examples of the polypropylene resin may include a homopolymer of polypropylene, and a copolymer of propylene and other monomer.

The copolymer of propylene and other monomer is not particularly limited. The copolymer may be a copolymer using known monomers. From the viewpoint of impact resistance, a copolymer of propylene and one or two or more α-olefins is preferable. From the viewpoint of high impact resistance and high rigidity, a random copolymer or a block copolymer of propylene and a C2 or C4-C20 α-olefin comonomer is more preferable. The content of the α-olefin in the polypropylene-based polymer (A) is preferably 25 mol % or less, and more preferably 20 mol % or less.

The C2 or C4-C20 α-olefin is not particularly limited. Examples thereof may include ethylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene, and vinylnorbornene.

The structure of the α-olefin is not particularly limited. The α-olefin may be linear or branched. For example, when the α-olefin has a branch structure and the branch position of an alkyl group is not specified, a branch is ordinarily present at a position where a carbon number of alkene is 3 or higher than 3.

The molecular structure of the polypropylene-based polymer (A) is not particularly limited. Examples thereof may include a linear structure, a branch structure, and a graft structure due to a denaturant.

The (A) component may be one polypropylene-based polymer, or may be a mixture of two or more polypropylene-based polymers. At this time, the dispersed form or the like is not limited. Examples thereof may include a form in which one polypropylene-based polymer is present as a continuous phase and other polypropylene-based polymer forms a disperse phase. Specific examples thereof may include a dispersed form in which a highly crystalline polypropylene resin forms a continuous phase and an ethylene-propylene copolymer forms a disperse phase when the (A) component is a mixture of the highly crystalline polypropylene resin and the ethylene-propylene copolymer. When the (A) component is a mixture of two or more polypropylene-based polymers, for example, separate solid-like pellets or the like may be used, which are obtained by polymerizing an isotactic highly crystalline polypropylene-based resin and an ethylene-propylene copolymer in separate processes.

The melt flow rate (MFR; 230° C., JIS K7210) of the (A) component is not particularly limited. From the viewpoint of processability, the melt flow rate thereof is preferably 1 g/10 minutes or more, and more preferably 30 g/10 minutes or more. From the viewpoint of rigidity, the melt flow rate is preferably 200 g/10 minutes or less, and more preferably 150 g/10 minutes or less.

The content of the (A) component in the polypropylene-based resin composition of the present embodiment is 50% by mass or more from the viewpoint of rigidity. The content thereof is 90% by mass or less from the viewpoint of impact resistance and tensile elongation at break. From the viewpoint of the above-mentioned advantages becoming more conspicuous, the content of the (A) component is preferably from 55 to 80% by mass, and more preferably from 57 to 70% by mass.

The preparing method of the polypropylene-based polymer (A) is not particularly limited. For example, the polypropylene-based polymer (A) can be prepared by known methods. For example, known catalysts such as a metallocene catalyst and a Ziegler-Natta catalyst may be used.

Various processes such as one step or multi steps may be employed as the preparing method of the polypropylene-based polymer (A). The polypropylene-based polymer (A) may be prepared by polymerizing methods such as a slurry polymerizing method, a gas phase polymerizing method, a bulk polymerizing method, and a solution polymerizing method, or a combination thereof. In various processes such as one-step and multi-step, heterologous polymers may be polymerized and mixed. For example, after an isotactic highly crystalline polypropylene-based resin is polymerized in a prior step, and an ethylene-propylene copolymer is polymerized in a subsequent step, these may be mixed.

<(B) Component>

The ethylene-α-olefin copolymer rubber (B) is a copolymer of ethylene and an α-olefin. The composition and physical properties or the like of the (B) component are not particularly limited. Known ethylene-α-olefin copolymer rubbers may be used.

Examples of the (B) component may include a copolymer of ethylene and one or more C3-C20 α-olefins. A copolymer of ethylene and one or more C3-C10 α-olefin comonomers is preferable. A copolymer of ethylene and one or more C4-C8 α-olefin comonomers is more preferable. A copolymer of ethylene and one or more comonomers selected from the group consisting of propylene, 1-butene, 1-hexene, 4-methyl-1-pentane, and 1-octene is still more preferable. A copolymer of ethylene and octene is yet still more preferable. The copolymer is preferable since the copolymer provides higher impact resistance and higher tensile elongation at break.

The preparing method of the ethylene-α-olefin copolymer rubber (B) is not particularly limited. Catalysts (for example, catalysts or the like based on titanium, metallocene, or vanadium) can be used, which can easily provide an α-olefin copolymer having an increased molecular weight under a processing condition ordinarily performed. Of these, the metallocene catalyst and titanium chloride are preferable from the viewpoint of stability of structure control.

The content of the α-olefin in the (B) component is not particularly limited. The content thereof is preferably 5% by mass or more from the viewpoint of resistance to low temperature curability and flexibility, and more preferably 20% by mass or more. The content is preferably 50% by mass or less from the viewpoint of rigidity, and more preferably 45% by mass or less.

The density of the (B) component is not particularly limited. The density thereof is preferably 0.850 g/cm$^3$ or more from the viewpoint of rigidity, and more preferably 0.855 g/cm$^3$ or more. The density is preferably 0.910 g/cm$^3$ or less from the viewpoint of high impact resistance and high tensile elongation at break, and more preferably 0.885 g/cm$^3$ or less.

Two or more ethylene-α-olefin copolymer rubbers may be used as the (B) component. In this case, for example, two or more ethylene-α-olefin copolymer rubbers having different densities are preferably used from the viewpoint of further improving impact resistance, tensile elongation at break and rigidity. For example, two ethylene-α-olefin copolymer rubbers having densities of 0.857 g/cm$^3$ and 0.870 g/cm$^3$ can be used in combination from the viewpoint of impact resistance, tensile elongation at break and rigidity.

The peak temperature of tan δ obtained from the dynamic viscoelastic measurement of the (B) component is not particularly limited. The peak temperature thereof is preferably −60° C. or more from the viewpoint of rigidity, and more preferably −50° C. or more. The peak temperature is preferably −30° C. or less from the viewpoint of impact resistance, and more preferably −35° C. or less.

The tan δ value at the peak temperature obtained from the viscoelastic measurement of the (B) component is preferably 0.2 or more from the viewpoint of obtaining high impact resistance, more preferably 0.25 or more, and still more preferably 0.30 or more.

The tan δ value and the peak temperature of the tan δ are values obtained by setting a sample cut in a size of 10 mm width and 35 mm length on an instrument "ARES" (manufactured by TA Instruments, trade name) in a torsion type geometry and carrying out the measurement under conditions of an effective measurement length of 25 mm, a strain of 0.5%, a frequency of 1 Hz, and a temperature-raising rate of 3° C./min from −70° C. to 50° C. The peak temperature of the tan δ can be detected by peak automated detection using "RSI Orchestrator" (manufactured by TA Instruments, trade name).

The melt flow rate (MFR; 190° C., 2.16 kg, ASTM D1238) of the (B) component is not particularly limited. The melt flow rate thereof is preferably 0.1 g/10 minutes or more from the viewpoint of processability, and more preferably 0.3 g/10 minutes or more. The melt flow rate is preferably 50 g/10 minutes or less from the viewpoint of mechanical characteristics, and more preferably 35 g/10 minutes or less.

The molecular weight distribution (Mw/Mn; Mw represents a weight average molecular weight, and Mn represents a number average molecular weight) of the (B) component is not particularly limited. The molecular weight distribution thereof is preferably from 1.3 to 5.0.

The content of the (B) component in the polypropylene-based resin composition of the present embodiment is not particularly limited. The content thereof is 5% by mass or more from the viewpoint of impact resistance and tensile elongation at break, preferably 8% by mass or more, and more preferably 10% by mass or more. The content is 50% by mass or less from the viewpoint of resistant rigidity, preferably 30% by mass or less, and more preferably 20% by mass or less.

<(C) Component>

The (C) component is a copolymer primarily comprising a vinyl aromatic monomer unit and an alkylene monomer unit, wherein a content of an α-olefin monomer unit in all alkylene monomers is 45 mol % or more.

The vinyl aromatic monomer is not particularly limited. Examples thereof may include vinyl aromatic compounds such as styrene, α-methylstyrene, p-methylstyrene, divinylbenzen, 1,1-diphenylethylene, N,N-dimethyl-p-aminoethylstyrene, and N,N-diethyl-p-aminoethylstyrene. These may be used singly or in combination of two or more.

In the present embodiment, in the nomenclature of each of the monomer units constituting a polymer, for example, the "vinyl aromatic monomer unit" means a repeating unit of a polymer produced as a result of polymerization of a vinyl aromatic compound which is a monomer. The structure is a molecular structure in which 2 carbons of a substituted ethylene group derived from a substituted vinyl group serve as a binding site. The "alkylene monomer unit" means a repeating unit of a polymer produced as a result of polymerization of alkylene which is a monomer, or a repeating unit obtained by polymerizing a conjugated diene monomer unit and thereafter hydrogenating the conjugated diene monomer unit. When one unsaturated group of one conjugated diene monomer unit is hydrogenated, one ethylene monomer having two hydrogenated unsaturated groups is converted to two ethylene monomers.

The conjugated diene monomer is a diolefin having a pair of conjugated double bonds. Examples thereof may include 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. Preferable examples thereof may include 1,3-butadiene, and isoprene. 1,3-Butadiene is more preferable from the viewpoint of mechanical strength. These may be used singly or in combination of two or more.

In the present embodiment, "primary comprising" means containing 60% by mass or more of the monomer unit in a polymer. It is preferable to contain 80% by mass or more of the monomer unit, more preferably 90% by mass or more, and still more preferably 95% by mass or more.

The kind of the α-olefin monomer contained in the alkylene monomer is not particularly limited. Examples thereof may include a C3-C20 α-olefin. Of these, at least one selected from the group consisting of propylene, 1-butene, and 1-octene is preferable from the viewpoint of impact resistance.

The content of the α-olefin monomer unit in all alkylene monomers may be 45 mol % or more from the viewpoint of impact resistance, preferably 52 mol % or more, more preferably 54 mol or more, and still more preferably 56 mol % or more. The content thereof is preferably 91 mol % or less from the viewpoint of productivity.

In the present embodiment, a vinyl bond content and an α-olefin amount in the conjugated diene unit contained before hydrogenation can be measured by nuclear magnetic resonance spectral analysis (NMR).

A method for polymerizing the (C) component is not particularly limited. Examples thereof may include a polymerizing method such as coordination polymerization, anionic polymerization, or cationic polymerization. Of these, the anionic polymerization is preferable from the viewpoint of facilitating the control of a molecular structure. A method for producing a block copolymer by the anionic polymerization may be a known method. Examples thereof may include methods described in Japanese Patent Publication Nos. 36-19286, 43-17979, 46-32415, 49-36957, 48-2423, 48-4106, and 56-28925, and Japanese Patent Laid-Open Nos. 59-166518, and 60-186577.

The structure of the (C) component is, for example, is represented by any one of the following formulae (1) to (6).

$$(a-b)n \tag{1}$$

$$b-(a-b)n \tag{2}$$

$$a-(b-a)n \tag{3}$$

$$a-(b-a)n-X \tag{4}$$

$$[(a-b)k]m-X \tag{5}$$

$$[(a-b)k-a]m-X \tag{6}$$

In the formulae (1) to (6), "a" represents a block primarily comprising a vinyl aromatic monomer unit; and "b" represents a block primarily comprising an alkylene monomer unit. When a plurality of polymer blocks a and b are present in the copolymer, structures such as the molecular weight and composition or the like of each of the polymer blocks may be the same or different.

In the formulae (1) to (6), X is a residue of a coupling agent such as silicon tetrachloride, tin tetrachloride, epoxidized soybean oil, a poly-halogenated hydrocarbon compound, a carboxylic ester compound, a polyvinyl compound, a bisphenol type epoxy compound, an alkoxysilane compound, a halogenated silane compound, or an ester compound, or a residue of an initiator such as a polyfunctional organic lithium compound. m, n, and k represent an integer of 1 or more, and preferably an integer of 1 to 5.

In the present embodiment, the boundary and farthest portion of each of the blocks may not necessarily be distinguished clearly. For example, a copolymer block of the vinyl aromatic monomer unit and the alkylene monomer unit may be present.

The distribution of the vinyl aromatic monomer unit in each of the polymer blocks is not limited as long as the content of the vinyl aromatic compound falls within the aforementioned range. The distribution may be even, tapered, staircase, convex, or concave. A crystal part may be present in the polymer blocks. A plurality of segments having different vinyl aromatic compound contents may coexist in each of the polymer blocks.

The α-olefin unit distribution of the alkylene monomer unit in each of the blocks is not particularly limited. The distribution may be varied. Examples of a method for varying a vinyl unit distribution of a conjugated diene before hydrogenation may include a method for adding a vinylating agent during polymerization, and a method for changing a temperature during polymerization.

The hydrogenation rate distribution of the conjugated diene unit is not particularly limited. The distribution may be varied. Examples of a method for varying the hydrogenation rate distribution may include a method for changing a vinyl unit distribution, and a method for copolymerizing isoprene and butadiene, then hydrogenating using a catalyst described below, and utilizing a difference between hydrogenation speeds of an isoprene unit and a butadiene unit to control the hydrogenation rate distribution.

It is preferable that the (C) component is a hydrogenated copolymer primarily comprising a vinyl aromatic monomer unit and a conjugated diene monomer unit; and an average vinyl bond content in all conjugated diene monomer units contained before hydrogenation is 62 mol % or more. First, the (C) component is preferably a hydrogenated copolymer primarily comprising a vinyl aromatic monomer unit and a conjugated diene monomer unit. In this case, an average vinyl bond content in all conjugated diene units contained before hydrogenation in the (C) component is more preferably 62 mol % or more from the viewpoint of impact resistance, still more preferably 68 mol % or more, yet still more preferably 70 mol or more, and yet still more preferably 72 mol % or more. The average vinyl bond content is more preferably 95 mol % or less from the viewpoint of productivity, still more preferably 90 mol % or less, and yet still more preferably 85 mol % or less.

Herein, the "vinyl bond content" means the proportion, before hydrogenation, of the conjugated dienes incorporated with 1,2-bond and 3,4-bond to those incorporated with the binding modes of 1,2-bond, 3,4-bond, and 1,4-bond. The average vinyl bond content in the all conjugated diene units contained before hydrogenation can be measured by nuclear magnetic resonance spectral analysis (NMR).

The block structure of the (C) component is not particularly limited. It is preferable that the (C) component contains at least two or more polymer blocks (a) primarily comprising a vinyl aromatic monomer unit from the viewpoint of high flexural modulus and impact resistance. Furthermore, the average vinyl bond content in the all conjugated diene monomer units contained before hydrogenation is more preferably 67 mol % or more. The (C) component still more preferably has the polymer blocks (a) primarily comprising a vinyl aromatic monomer unit at both the ends of the (C) component.

The content of the polymer block (a) primarily comprising a vinyl aromatic monomer unit in the (C) component is not particularly limited. The content thereof is preferably 5% by mass or more from the viewpoint of heat resistance and tensile strength, and is preferably 40% by mass or less from the viewpoint of flexibility. The content is in the range of more preferably from 10 to 30% by mass, and still more preferably from 13 to 20% by mass.

The content of the polymer block primarily comprising a vinyl aromatic monomer unit is defined in accordance with the following formula by using the mass of a vinyl aromatic compound polymer block (except a vinyl aromatic compound polymer having an average polymerization degree of about 25 or less) obtained using a method of oxidatively degrading the copolymer before hydrogenation, with tert-butyl hydroperoxide in the presence of osmium tetroxide as a catalyst (the method described in I. M. Kolthoff, et al., J. Polym. Sci. 1,429 (1946) and hereinafter also referred to as the "osmium tetroxide oxidative degradation method").

Content (% by Mass) of Compound Polymer Block Primarily Comprising Vinyl Aromatic Monomer Unit=(Mass of Vinyl Aromatic Compound Polymer Block in Copolymer Before Hydrogenation/ Mass of Copolymer Before Hydrogenation)×100

When the (C) component is a hydrogenated copolymer primarily comprising a vinyl aromatic monomer unit and a conjugated diene monomer unit, the hydrogenation rate of all unsaturated group units contained in the conjugated diene monomer unit before hydrogenation in the (C) component is preferably 75 mol % or more from the viewpoint of high mechanical strength, high aging resistance and high UV resistance, more preferably 85 mol %, still more preferably 90 mol %, and yet still more preferably 95 mol % or more. The hydrogenation rate of the all unsaturated group units contained in the conjugated diene monomer unit before hydrogenation can be measured by nuclear magnetic resonance spectral analysis (NMR).

The hydrogenation method is not particularly limited. Examples thereof may include a method for feeding hydrogen in the presence of a hydrogenation catalyst to hydrogenate an unsaturated group. The hydrogenation catalyst is not particularly limited. Examples thereof may include the following conventionally known hydrogenation catalysts:

(1) a support type heterogeneous hydrogenation catalyst having a metal such as Ni, Pt, Pd or Ru supported on carbon, silica, alumina, or diatomaceous earth or the like;

(2) a so-called Ziegler type hydrogenation catalyst using a transition metal salt (such as an organic acid salt or acetylacetone salt of a metal, such as Ni, Co, Fe or Cr), and a reducing agent, such as organoaluminum; and (3) a homogeneous hydrogenation catalyst such as so-called organic metal complex, e.g., an organic metal compound of Ti, Ru, Rh, Zr or the like.

Specific examples of the hydrogenation catalyst may include hydrogenation catalysts described in Japanese Patent Publication Nos. 42-8704, 43-6636, 63-4841, 1-37970, 1-53851, and 2-9041 or the like.

The weight average molecular weight of the (C) component is preferably 40,000 or more from the viewpoint of impact resistance and mechanical strength, more preferably 50,000 or more, and still more preferably 65,000 or more. The weight average molecular weight thereof is preferably 400,000 or less from the viewpoint of processability, more preferably 250,000 or less, and still more preferably 160,000 or less. The molecular weight distribution (weight average molecular weight/number average molecular weight) is preferably smaller from the viewpoint of impact resistance. Specifically, the molecular weight distribution is preferably 1.3 or less, more preferably 1.2 or less, and still more preferably 1.1 or less.

The amount of the (C) component in the polypropylene-based resin composition of the present embodiment is 0.1% by mass or more from the viewpoint of impact resistance and tensile elongation at break, and is 5% by mass or less in respect of high impact resistance and high rigidity. From the viewpoint of these advantages becoming more conspicuous, the content of the (C) component is preferably 0.3 to 4% by mass, more preferably 0.4 to 3% by mass, and still more preferably 0.5 to 2% by mass.

<(D) Component>

It is preferable that the polypropylene-based resin composition of the present embodiment further contains 2 to 30% by mass of a copolymer (D) primarily comprising a vinyl aromatic monomer unit and an alkylene monomer unit, wherein a content of an α-olefin monomer unit in all alkylene monomers is less than 45 mol %, from the viewpoint of improving impact resistance and rigidity, and suppressing a weld line.

The vinyl aromatic monomer of the (D) component is not particularly limited. A monomer or the like used as the vinyl aromatic monomer of the (C) component can be also used. Examples thereof may include vinyl aromatic compounds, such as styrene, α-methylstyrene, p-methylstyrene, divinylbenzen, 1,1-diphenylethylene, N,N-dimethyl-p-aminoethylstyrene, and N,N-diethyl-p-aminoethylstyrene. These may be used singly or in combination of two or more.

Unless otherwise noted, the nomenclature of each of the monomer units constituting the polymer contained in the (D) component is the same as that of the above-mentioned (C) component. For example, the "vinyl aromatic monomer unit" in the (D) component means a repeating unit of a polymer produced as a result of polymerization of a vinyl aromatic compound which is a monomer. The structure is a molecular structure in which 2 carbons of a substituted ethylene group derived from a substituted vinyl group serve as a binding site. The "alkylene monomer unit" means a repeating unit of a polymer produced as a result of polymerization of alkylene which is a monomer, or a repeating unit obtained by polymerizing a conjugated diene monomer unit and thereafter hydrogenating the conjugated diene monomer unit. When one unsaturated group of one conjugated diene monomer unit is hydrogenated, one ethylene monomer having two hydrogenated unsaturated groups is converted to two ethylene monomers.

The kind of the α-olefin monomer contained in the alkylene monomer is not particularly limited. A monomer or the like used as the α-olefin monomer of the (C) component can be also used. Examples thereof may include a C3-C20 α-olefin. Of these, at least one selected from the group consisting of propylene, 1-butene, and 1-octene is preferable from the viewpoint of impact resistance.

The conjugated diene monomer before hydrogenation of the (D) component is not particularly limited. A monomer or the like used as the conjugated diene monomer of the (C) component can be also used. Examples thereof may include 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. Preferable examples may include 1,3-butadiene, and isoprene. 1,3-Butadiene is more preferable from the viewpoint of mechanical strength. These may be used singly or in combination of two or more.

The content of the α-olefin monomer unit of all the alkylene monomers in the (D) component is preferably 21 mol % or more from the viewpoint of impact resistance and tensile elongation at break, more preferably 25 mol % or more, and still more preferably 29 mol % or more. The content thereof is preferably less than 45 mol % from the viewpoint of impact resistance and rigidity, more preferably 43 mol % or less, and still more preferably 38 mol % or less.

As described above, the kind and content of the vinyl aromatic monomer and the alkylene monomer in the (D) component are not particularly limited. The kind which can be used as the (C) component can be used. The kind and content of the monomer of the (C) component may be the same as, or different from the kind and content of the (D) component.

The method for producing the (D) component is not particularly limited. The above method may be a known method. For example, the method for producing the (C) component can be also appropriately employed for the (D) component.

The molecular structure of the (D) component is not particularly limited. The molecular structure thereof may be a suitable structure according to desired physical properties and the like. For example, the above molecular structure of the (C) component can be also appropriately employed for the (D) component. The molecular structure of the (D) component may be the same as, or different from that of the (C) component.

The ranges of molecular weight and molecular weight distribution of the (D) component are not particularly limited. The molecular weight and the molecular weight distribution can be appropriately set to suitable numerical values. The molecular weight and molecular weight distribution of the (D) component may be the same as, or different from those of the (C) component.

A temperature in polymerizing a polymer block primary comprising a conjugated diene monomer unit before hydrogenation is preferably fixed from the viewpoint of impact resistance. The range of temperature during polymerizing is more preferably ±5° C. or less, still more preferably ±3° C. or less, and yet still more preferably ±2° C. or less.

When the (D) component is a hydrogenated copolymer primarily comprising a vinyl aromatic monomer unit and a conjugated diene monomer unit, an average vinyl bond content in all conjugated diene units contained before hydrogenation, in the (D) component is preferably less than 62 mol % from the viewpoint of impact resistance and rigidity, more preferably 60 mol % or less, and still more preferably 55 mol % or less. The average vinyl bond content is preferably 35 mol % or more from the viewpoint of impact resistance and tensile elongation at break, more preferably 40 mol % or more, and still more preferably 45 mol % or more.

The (D) component preferably contains two or more polymer blocks primarily comprising a vinyl aromatic monomer unit as the block structure of the (D) component. Furthermore, the average vinyl bond content in the all conjugated diene monomer units contained before hydrogenation is more preferably 67 mol % or more. The (D) component still more preferably has polymer blocks primarily comprising a vinyl aromatic monomer unit, at both the ends of the (D) component. The content of (a) the polymer block primarily comprising the vinyl aromatic monomer unit in the (D) component is not particularly limited. The content thereof is preferably 5% by mass or more from the viewpoint of heat resistance and tensile strength, more preferably 10% by mass or more, and still more preferably 13% by mass or more. The content is preferably 40% by mass or less from the viewpoint of flexibility, more preferably 30% by mass or less, and still more preferably 20% by mass or less.

The crystal melting heat quantity (ΔH) of the (D) component is preferably 3.0 J/g or less from the viewpoint of impact resistance or color developability, more preferably 1.5 J/g or less, still more preferably 0.5 J/g or less, and yet more preferably 0.1 J/g or less. The crystal melting heat quantity (ΔH) can be measured by differential scanning calorimetry.

It is preferable that the (D) component contains at least two polymer blocks primarily comprising a vinyl aromatic monomer unit; and an average vinyl bond content in a conjugated diene unit contained before hydrogenation is from 35 to 60 mol %. The component can provide more excellent impact resistance, tensile elongation at break and rigidity.

The content of the (D) component in the polypropylene-based resin composition of the present embodiment is not particularly limited. The content thereof is preferably 2% by mass or more from the viewpoint of impact resistance and tensile elongation at break, more preferably 3% by mass or more, and still more preferably 4% by mass or more. The content is preferably 30% by mass or less from the viewpoint of high rigidity and high economic efficiency, more preferably 15% by mass or less, and still more preferably 10% by mass or less.

<(E) Component>

It is preferable that the polypropylene-based resin composition of the present embodiment further contains an inorganic filler (E) from the viewpoint of rigidity, impact resistance and economic efficiency.

The (E) component is not particularly limited, and may be a known component. Examples thereof may include silica, calcium carbonate, magnesium carbonate, magnesium hydroxide, aluminum hydroxide, calcium sulfate, barium sulfate, carbon black, glass fibers, glass beads, glass balloons, glass flakes, graphite, titanium oxide, potassium titanate whiskers, carbon fibers, alumina, kaolin clay, silicic acid, calcium silicate, quartz, mica, talc, clay, zirconia, potassium titanate, alumina, and metal particles. Of these, talc and calcium carbonate are more preferable from the viewpoint of rigidity and impact resistance, and talc is more preferable.

The shape of the (E) component is not particularly limited. The shape thereof may be scaly, spherical, granular, powdery, and amorphous, or the like. These may be used singly or in combinations of two or more.

The content of the (E) component in the polypropylene-based resin composition of the present embodiment is preferably 5% by mass or more from the viewpoint of rigidity and impact, more preferably 10% by mass or more, and still more preferably 15% by mass or more. The content thereof is preferably 30% by mass or less from the viewpoint of impact and tensile elongation at break, more preferably 25% by mass or less, and still more preferably 23% by mass or less.

In the present embodiment, other polymer other than the (A) component to the (D) component may be further contained according to requirement performance. Preferable specific examples of the other polymer may include polyethylene, polystyrene, polycyclohexylethane, polyester such as polyethylene terephthalate, an ethylene/styrene interpolymer, syndiotactic PS, and EPDM. More preferable examples may include low density polyethylene (LDPE), linear low density polyethylene (LLDPE), and high density polyethylene (HDPE). These may be used singly or in combination of two or more.

The content of the other polymer other than the (A) component to the (D) component in the polypropylene-based resin composition of the present embodiment is not particularly limited. The content thereof is preferably 10% by mass or less from the viewpoint of impact resistance, tensile elongation at break and rigidity.

In the present embodiment, other additive may be used in combination according to requirement performance. The additive is not particularly limited. Examples thereof may include a fire retardant, a stabilizer, a colorant, a pigment, an antioxidant, an antistatic agent, a disperser, a flow enhancing agent, a mold-releasing agent such as metallic stearate, silicone oil, a mineral oil-based softener, a synthetic resin-based softener, a copper inhibitor, a cross-linker, and a nucleating agent.

The mass ratio ((C)/(B)) of the (C) component to the (B) component is preferably 1/2 or less from the viewpoint of improving impact resistance, rigidity, and tensile elongation at break, and suppressing a weld line during injection molding, more preferably 1/3 or less, and still more preferably 1/4 or less. The mass ratio ((C)/(D)) of the (C) component to the (D) component is preferably 1/2 or less from the viewpoint of improving impact resistance, rigidity, and tensile elongation at break, and suppressing a weld line during injection molding, and more preferably 1/3 or less.

<Dispersed Form>

In the present embodiment, the reason of obtaining excellent advantages while the content of the (C) component is small is not clear. However, the reason will be presumed as described below. The (B) component is moderately finely dispersed in the composition, and a moderate number of minute micells derived from the (C) component may be formed in the (A) component. Furthermore, these advantages are further promoted by using the (D) component in combination (although the operation is not limited thereto).

The dispersed form of the polypropylene-based resin composition of the present embodiment is not particularly limited. It is preferable that the (A) component forms a continuous phase; the (B) component is present as a disperse phase (a first disperse phase) in the continuous phase; and at least one of the (C) component and the (D) component is dispersed on the interface between the continuous phase and the first disperse phase, from the viewpoint of enhancing impact resistance and tensile elongation, and suppressing a weld line. The ratio of the outer layer surface of dispersed particles of the (B) component covered with the (C) component and/or the (D) component is preferably 70% or more, more preferably 80% or more, and still more preferably 90% or more. The dispersed form of the polypropylene-based resin composition can be analyzed by a transmission electron microscope.

The melt flow rate (MFR; 230° C., 2.16 kg, ISO 1133: 1997) of the propylene resin composition of the present embodiment is not particularly limited. The melt flow rate thereof is preferably from 5 g/10 minutes to 150 g/10 minutes from the viewpoint of processability, more preferably from 20 g/10 minutes to 100 g/10 minutes, and still more preferably from 30 g/10 minutes to 60 g/10 minutes.

The specific gravity of the propylene resin composition is not particularly limited. The specific gravity thereof is preferably from 0.90 g/cm$^3$ to 1.10 g/cm$^3$ from the viewpoint of light in weight and bending elasticity, more preferably from 1.00 g/cm$^3$ to 1.07 g/cm$^3$, and still more preferably from 1.02 g/cm$^3$ to 1.05 g/cm$^3$.

<Molded Article>

A molded article containing the polypropylene-based resin composition of the present embodiment can be produced. The polypropylene-based resin composition of the present embodiment can be prepared by known blending or mixing means. Suitable techniques can be appropriately selected. Components to be mixed are preferably blended with one another by a one-step process or a multi-step process. Furthermore, the polypropylene-based resin composition may be prepared by dry-blending respective components, and thereafter melt-mixing the components. The polypropylene-based resin composition may be directly prepared in an extruder for producing a molded article (for example, a completed product such as an automobile part). The components may be preliminarily mixed in a separate extruder (for example, a Banbury Mixer). The dry-blended material of the polypropylene-based resin composition of the present embodiment may be directly injection-molded without being preliminarily melt-mixed.

A mixing apparatus is not particularly limited. Examples thereof include kneaders such as a Banbury mixer, a laboplast mill, a single-screw extruder, and a twin-screw extruder. Of these, a melt-mixing method using the extruder is preferable from the viewpoint of productivity and good kneading property. A part of components to be mixed may be blended in a different step in order to obtain more excellent performance.

The polypropylene-based resin composition of the present embodiment can be molded by softening or melting the polypropylene-based resin composition by heating. For example, the polypropylene-based resin composition can be molded by using conventional molding techniques such as compression molding, injection molding, gas-assisted injection molding, hollow molding, sheet forming, rotational molding, laminating, calendering, vacuum forming, thermoforming or hot forming, and extrusion. These molding techniques may be used singly or in combination of two or more. Of these, the injection molding is preferable from the viewpoint of productivity.

The molded article containing the polypropylene-based resin composition of the present embodiment may be molded in any shape or form, and can be used as various members. For example, the molded article can be utilized for automobile exterior and interior members such as a bumper beam, a bumper board, a pillar, and a meter panel; a housing and a cover for an electrical component and an electrical instrument; other household use or individual products containing, for example, a home electric appliance, a household product, a freezer container, and a box; a garden furniture; and a sheet for building and for construction, or the like. Of these, the molded article can be preferably utilized as an automobile interior or exterior material from the viewpoint of strongly requiring impact resistance, tensile elongation at break and rigidity.

EXAMPLES

The present invention will hereinafter be described in further detail with reference to Examples. The present invention is however not limited to the following Examples. An evaluating method and a measuring method used in the Examples will be described below.

(1) Measurement of Styrene Content, Average Vinyl Bond content in Conjugated Diene Monomer Unit, and Hydrogenation Rate of Double Bond Derived from Conjugated Diene Monomer Unit in Copolymer Primarily Comprising Vinyl Aromatic Monomer Unit and Conjugated Diene Monomer Unit A styrene content, an average vinyl bond content in a conjugated diene monomer unit, and an average hydrogenation rate of a double bond derived from the conjugated diene monomer unit in a copolymer primarily comprising a vinyl aromatic monomer unit and a conjugated diene monomer unit were measured by nuclear magnetic resonance spectral analysis (NMR) according to the following conditions.

Measuring instrument: JNM-LA400 (manufactured by JEOL Ltd.)
Solvent: deuterated chloroform
Measurement samples: samples taken before and after hydrogenation of a polymer
Sample concentration: 50 mg/mL
Observation frequency: 400 MHz
Chemical shift standard: TMS (tetramethylsilane)
Pulse delay: 2.904 sec
Number of scans: 64 times
Pulse width: 45 degrees
Measurement temperature: 26° C.

(2) Content of Polymer Block Primarily Comprising Vinyl Aromatic Monomer Unit

This was measured by the osmium tetroxide oxidation method described in I. M. Kolthoff, et al., J. Polym. Sci., Vol. 1, p. 429 (1946). Measurement samples: samples taken before hydrogenation of the polymer Solution for degradation of the polymer: a solution of 0.1 g of osmic acid dissolved in 125 mL of tert-butanol (3) Weight Average Molecular Weight, Number Average Molecular Weight, and Molecular Weight Distribution of Copolymer Primarily Comprising Vinyl Aromatic Monomer Unit and Conjugated Diene Monomer Unit The weight average molecular weight, number average molecular weight, and molecular weight distribution (Mw/Mn) of a copolymer primarily comprising a vinyl aromatic monomer unit and a conjugated diene monomer unit were measured by gel permeation chromatography (GPC) according to the following conditions. The molecular weight distribution was obtained by calculating the ratio of the obtained weight average molecular weight to the obtained number average molecular weight.

Measuring instrument: LC-10 (manufactured by Shimadzu Corporation)
Column: TSK gel GMHXL (4.6 mm ID×30 cm), 2 columns
Solvent: Tetrahydrofuran
Sample for calibration curve: Commercially available standard polystyrene (manufactured by Tosoh Corporation), 10-point measurement (A) Component
(A) Polypropylene polymer: Block PP (J709QG, manufactured by Prime Polymer Co., Ltd., MI: 55 g/10 minutes)
(B) Component
(B) Ethylene-α-Olefin Copolymer Rubber (ENGAGE8200, manufactured by The Dow Chemical Company, MFR (190° C., 2.16 kg): 5 g/10 minutes) Ethylene-α-olefin copolymer rubber (ENGAGE8842, manufactured by The Dow Chemical Company, MFR (190° C., 2.16 kg): 1 g/10 minutes)
The MFR of the (B) component was measured according to ASTM D1238.
(C) Component and (D) Component
A hydrogenation catalyst used for a hydrogenation reaction for a (C) component and a (D) component was prepared by the following method.

1 L of cyclohexane dried and refined was charged to a reaction vessel replaced with nitrogen, and 100 mmol of bis(cyclopentadienyl)titanium dichloride was added thereto. An n-hexane solution containing 200 mmol of trimethyl aluminum was added thereto with sufficient stirring. The resulting solution was reacted at room temperature for about three days.

(Preparation of (C) Component: Polymer 1)

First, a hydrogenated copolymer primarily comprising a vinyl aromatic monomer unit and a conjugated diene monomer unit was prepared.

A block copolymer was prepared by the following method using a tank type reactor having an inner volume of 10 L and equipped with a stirrer and a jacket.

A given amount of cyclohexane was charged to the reactor, and was adjusted to a temperature of 60° C. n-Butyllithium was then added from the bottom part of the reactor so that the amount of n-butyllithium was 0.08 parts by mass with respect to 100 parts by mass of all monomers (the total amount of a butadiene monomer and styrene monomer introduced to the reactor). Furthermore, a cyclohexane solution of N,N,N',N,'-tetramethylethylene diamine was added so that the amount of N,N,N',N,'-tetramethylethylene diamine was 1.8 mol with respect to 1 mol of n-butyllithium. Then, a cyclohexane solution (monomer concentration: 20% by mass) containing 7 parts by mass of styrene in the first step as a monomer was fed thereto for about 10 minutes, and the temperature in the reactor was adjusted to 60° C. After the feeding of the cyclohexane solution was stopped, the reaction was performed while the temperature in the reactor was adjusted to 70° C. for 15 minutes. Next, a cyclohexane solution (monomer concentration: 20% by mass) containing 86 parts by mass of butadiene in the second step was continuously fed to the reactor at a fixed rate for 60 minutes. The temperature in the reactor in the meantime was adjusted to 50° C. After the feeding of the cyclohexane solution was stopped, the reaction was performed while the temperature in the reactor was adjusted to 50° C. for 10 minutes. Next, a cyclohexane solution (monomer concentration: 20% by mass) containing 7 parts by mass of styrene in the third step was continuously fed to the reactor at a fixed rate for 20 minutes. The temperature in the reactor in the meantime was adjusted to 70 to 80° C. After the feeding of the cyclohexane solution was stopped, the reaction was performed while the temperature in the reactor was adjusted to 70° C. for 10 minutes.

After the completion of the polymerization, a cyclohexane solution of methanol was added so that the amount of methanol was 1 equivalence with respect to 1 mol of n-butyllithium, and the polymerization reaction was completed to obtain a copolymer. When the copolymer obtained by the polymerization was analyzed, a styrene content was 14% by mass; a polystyrene block content was 14% by mass; an average vinyl bond content of a butadiene part (corresponding to an average vinyl bond content in all conjugated diene monomer units) was 75 mol %; a mass average molecular weight was 148,000; and a molecular weight distribution was 1.05.

Next, a hydrogenation reaction was performed for the obtained copolymer at 70° C. using the above-mentioned hydrogenation catalyst. After the completion of the reaction, 0.25 parts by mass of a stabilizer (octadecyl-3-(3,5-di-t-butyl-4-hydroxyphenyl)propionate) was added to 100 parts by mass of a copolymer to obtain a polymer 1.

The hydrogenation rate of the polymer 1 was 98 mol %; and the content of an α-olefin monomer unit in all alkylene monomers was 60 mol %.

(Preparation of (C) Component: Polymer 2)

A polymer 2 was produced in the same manner as in the polymer 1 except that a cyclohexane solution of N,N,N',N,'-tetramethylethylene diamine was added so that the amount of N,N,N',N,'-tetramethylethylene diamine was 1.6 mol with respect to 1 mol of n-butyllithium.

A styrene content was 14% by mass; a polystyrene block content was 14% by mass; an average vinyl bond content of a butadiene part (corresponding to an average vinyl bond content in all conjugated diene monomer units) was 68 mol %; a mass average molecular weight was 145,000; and a molecular weight distribution was 1.05.

The hydrogenation rate of the polymer 2 was 98 mol %; and the content of the α-olefin monomer unit in all the alkylene monomers was 52 mol %.

(Preparation of (D) Component: Polymer 3)

First, a hydrogenated copolymer primarily comprising a vinyl aromatic monomer unit and a conjugated diene monomer unit was prepared.

A block copolymer was prepared by the following method using a tank type reactor having an inner volume of 10 L and equipped with a stirrer and a jacket.

A given amount of cyclohexane was charged to a reactor, and was adjusted to a temperature of 70° C. n-butyllithium was then added from the bottom part of the reactor so that the amount of n-butyllithium was 0.09 parts by mass with respect to 100 parts by mass of all monomers (the total amount of a butadiene monomer and styrene monomer introduced to the reactor). Furthermore, a cyclohexane solution of N,N,N',N,'-tetramethylethylene diamine was added so that the amount of N,N,N',N,'-tetramethylethylene diamine was 0.5 mol with respect to 1 mol of n-butyllithium. Then, a cyclohexane solution (monomer concentration: 20% by mass) containing 9 parts by mass of styrene in the first step as a monomer was fed thereto for about 10 minutes, and the temperature in the reactor was adjusted to 70° C. After the feeding of the cyclohexane solution was stopped, the reaction was performed while the temperature in the reactor was adjusted to 70° C. for 15 minutes. Next, a cyclohexane solution (monomer concentration: 20% by mass) containing 82 parts by mass of butadiene in the second step was continuously fed to the reactor at a fixed rate for 60 minutes. The temperature in the reactor in the meantime was adjusted to 70° C. After the feeding of the cyclohexane solution was stopped, the reaction was performed while the temperature in the reactor was adjusted to 70° C. for 10 minutes. Next, a cyclohexane solution (monomer concentration: 20% by mass) containing 9 parts by mass of styrene in the third step was continuously fed to the reactor at a fixed rate for 20 minutes. The temperature in the reactor in the meantime was adjusted to 70 to 80° C. After the feeding of the cyclohexane solution was stopped, the reaction was performed while the temperature in the reactor was adjusted to 70 to 80° C. for 10 minutes.

After the completion of the polymerization, a cyclohexane solution of methanol was added so that the amount of methanol was 1 equivalence with respect to 1 mol of n-butyllithium, and the polymerization reaction was completed to obtain a copolymer. When the copolymer obtained by the polymerization was analyzed, a styrene content was 18% by mass; a polystyrene block content was 18% by mass; an average vinyl bond content of a butadiene part (corresponding to an average vinyl bond content in all conjugated diene monomer units) was 50 mol %; a mass average molecular weight was 83,000; and a molecular weight distribution was 1.05.

Next, a hydrogenation reaction was performed for the obtained copolymer in the same manner as in the polymer 1. After the completion of the reaction, 0.25 parts by mass of a stabilizer (octadecyl-3-(3,5-di-t-butyl-4-hydroxyphenyl)propionate) was added to 100 parts by mass of a copolymer to obtain a polymer 3.

The hydrogenation rate of the polymer 3 was 98 mol %; and the content of an α-olefin monomer unit in all the alkylene monomers was 34 mol %.

(Preparation of (D) Component: Polymer 4)

A polymer 4 was produced in the same manner as in the polymer 3 except that a cyclohexane solution of N,N,N',N,'-tetramethylethylene diamine was added so that the amount of N,N,N',N,'-tetramethylethylene diamine was 0.4 mol with respect to 1 mol of n-butyllithium.

A styrene content was 18% by mass; a polystyrene block content was 18% by mass; an average vinyl bond content of a butadiene part (corresponding to an average vinyl bond content in all conjugated diene monomer units) was 40 mol %; a mass average molecular weight was 81,000; and a molecular weight distribution was 1.05.

The hydrogenation rate of the polymer 4 was 98 mol %; and the content of the α-olefin monomer unit in all the alkylene monomers was 25 mol %.

(E) Component

Talc: JM209 (manufactured by Asada Milling Co., Ltd., average particle diameter of 3.5 μm)

(Other Additives)

Stabilizer: Irgnox1010 (manufactured by Ciba Speciality Chemicals)

Stabilizer: Irgfos168 (manufactured by Ciba Speciality Chemicals)

(Production of Molded Body of Polypropylene-Based Resin Composition)

The components having the percentages shown in Table 1 were kneaded under conditions of a temperature of 180° C., a rotation speed of 350 rpm, and an output rate of 5 kg/h in a twin-screw extruder (L/D=42, 30 mmφ). The kneaded matter was molded at an injection-molding temperature of 220° C. and a die temperature of 40° C. to produce a molded body made of a polypropylene-based resin composition.

(Evaluating Method of Molded Body of Polypropylene Resin Composition)

Following measurements and evaluations were performed for characteristics of polypropylene-based resin compositions of Examples and Comparative Examples. The results are shown in Tables 1 and 2.

(1) Melt Flow Rate (MFR)

This was evaluated according to ISO 1133: 1997.

(Unit: g/10 minutes, 230° C., 2.16 kgf)

(2) Tensile Elongation

This was evaluated according to ASTM D 638-03.

(3) Flexural Modulus

This was evaluated according to ASTM D 790-03.

(4) Impact Resistance (Charpy Impact Strength)

This was evaluated according to ISO 179.

(5) Generating Length of Weld Mark

When a plate having a length of 350 mm, a width of 135 mm, and a thickness of 3 mm was molded, a die was used, which had a gate provided at a position separated by 70 mm from a width surface on a side surface in a length direction. The die had a weir provided immediately below the gate in a flow direction (at a position separated by 50 mm from the gate). The weir had a length of 20 mm, a width of 20 mm, and a thickness of 3 mm and hindered the flow of a resin. When injection molding was performed by using the die, the generating length of a weld mark was obtained by measuring a length of the weld mark until the weld mark generated after the weir could not be visually distinguished. The case where the length was large was determined to be "x" (poor). The case where length was short was determined to be "∘" (good).

(6) Observation of Phase Component

The obtained molded body was sliced and dyed with ruthenium. The molded body was then observed by a transmission electron microscope (manufactured by JEOL Ltd.). As a result, it was confirmed that the (A) component, the (B) component, the (C) component, and the (D) component were present as described below in the molded bodies of Examples 1 to 6, that the (A) component and the (B) component were each present as a continuous phase, and a disperse phase, and that the (C) component and the (D) component are dispersed on the interface between the (A) component and the (B) component. It was confirmed that 70% or more of the outer layer surface of the dispersed particles of the (B) component was covered with the (C) component or the (D) component.

Example 1 and Comparative Examples 1 and 2

As a result of evaluating the compositions in which the amount of the (C) component was changed, it was confirmed that each of at least the tensile elongation (between chucks), flexural modulus, and Charpy impact strength of Example 1 was excellent. On the other hand, it was confirmed that at least any one of the tensile elongation (between chucks), flexural modulus, and Charpy impact strength of each of the Comparative Examples 1 and 2 was low.

Examples 2 to 6 and Comparative Examples 3 and 4

As shown in Table 2, it was confirmed that each of the tensile elongation (between chucks), flexural modulus, Charpy impact strength, and suppression of the weld line of each of the Examples was excellent. On the other hand, it was

TABLE 1

| | | | | Example 1 | Comparative Example 1 | Comparative Example 2 |
|---|---|---|---|---|---|---|
| Composition | (A) J709QG | | Parts by mass | 64 | 64 | 64 |
| | (B) ENGAGE8842 | | Parts by mass | 15 | 16 | 10 |
| | (C) Polymer 1 | | Parts by mass | 1 | — | 6 |
| | (E) Talc | | Parts by mass | 20 | 20 | 20 |
| | (Other additives) Irgnox1010/Irgfos168 | | Parts by mass/ Parts by mass | | 0.4/0.1 | |
| Test items | Specific gravity | | g/cm$^3$ | 1.03 | 1.03 | 1.03 |
| | MFR (L) | 230° C., 2.16 kg | g/10 min | 30 | 30 | 30 |
| | Tensile elongation (between chucks) | | % | 340 | 240 | 520 |
| | Flexural modulus | | MPa | 1750 | 1750 | 1610 |
| | Charpy impact strength ISO179 (hammer; 2 J) | 23° C. | kJ/m$^2$ | 49.1 | 48.3 | 17.3 |
| | | −30° C. | kJ/m$^2$ | 4.1 | 4.0 | 2.3 |
| | Weld line | | | ∘~x | x | x |

TABLE 2

| | | | Example 2 | Example 3 | Example 4 | Example 5 | Example 6 | Comparative Example 3 | Comparative Example 4 | Comparative Example 5 |
|---|---|---|---|---|---|---|---|---|---|---|
| Composition | (A) J709QG | Parts by mass | 62 | 62 | 62 | 62 | 62 | 62 | 62 | 62 |
| | (B) ENGAGE8842 | Parts by mass | 12 | 12 | 12 | 12 | 12 | 12 | 12 | 12 |
| | (C) Polymer 1 | Parts by mass | 0.8 | 1.5 | 3 | | 0.8 | — | 5.5 | — |
| | (C) Polymer 2 | Parts by mass | | | | 0.8 | | | | |
| | (D) Polymer 3 | Parts by mass | 5.2 | 4.5 | 3 | 5.2 | | 6 | 0.5 | |
| | (D) Polymer 4 | Parts by mass | | | | | 5.2 | | | 6 |
| | (E) Talc | Parts by mass | 20 | 20 | 20 | 20 | 20 | 20 | 20 | 20 |
| | (Other additives) Irgnox1010/ Irgfos168 | Parts by mass/ Parts by mass | | | | | 0.4/0.1 | | | |
| Test items | Specific gravity | g/cm$^3$ | 1.04 | 1.04 | 1.04 | 1.04 | 1.04 | 1.03 | 1.04 | 1.04 |
| | MFR (230° C., 2.16 kg) | g/10 min | 33 | 33 | 32 | 33 | 32 | 33 | 31 | 33 |
| | Tensile elongation (between chucks) | % | 440 | 463 | 529 | 420 | 430 | 341 | 544 | 341 |
| | Flexural modulus | MPa | 1720 | 1680 | 1610 | 1730 | 1710 | 1740 | 1600 | 1730 |
| | Charpy impact strength ISO179 (hammer; 2 J) | 23° C. kJ/m$^2$ | 53.7 | 51.5 | 50.7 | 53.0 | 52.5 | 48.1 | 17.5 | 47.2 |
| | | −30° C. kJ/m$^2$ | 4.5 | 4.2 | 3.4 | 4.3 | 4.4 | 4.1 | 2.5 | 4.0 |
| | Weld line | | ∘ | ∘ | ∘ | ∘ | ∘ | x | ∘~x | x | confirmed that at least any one of the tensile elongation (between chucks), flexural modulus, Charpy impact strength, and suppression of the weld line of each of the Comparative Examples was low.

As described above, in the Examples, it was confirmed that the polypropylene-based resin composition according to the present invention was excellent in each of at least impact resistance, tensile elongation at break and rigidity.

The present application was based on Japanese Patent Application No. 2009-059646 filed on Mar. 12, 2009 with the Japan Patent Office, and the contents thereof, which were incorporated herein by reference.

Industrial Applicability

The polypropylene-based resin composition and molded article of the present invention can be utilized for, for example, automobile exterior and interior members such as a bumper beam, a bumper board, a pillar, and a meter panel; a housing and a cover for an electrical component and an electrical instrument; other household use or individual products containing, for example, a home electric appliance, a household product, a freezer container, and a box; a garden furniture; and a sheet for building and for construction, or the like. Of these, the polypropylene-based resin composition and the molded article can be preferably utilized as the automobile interior and exterior members.

What is claimded is:

1. A polypropylene-based resin composition comprising:
   50 to 90% by mass of a polypropylene-based polymer (A);
   5 to 50% by mass of an ethylene-α-olefin copolymer rubber (B);
   0.1 to 5% by mass of a copolymer (C) primarily comprising a vinyl aromatic monomer unit and an alkylene monomer unit, wherein a content of an α-olefin monomer unit in all alkylene monomers in copolymer (C) is 45 mol % or more; and
   2 to 30% by mass of a copolymer (D) comprising two or more polymer blocks primarily comprising a vinyl aromatic monomer unit as the block structure of the (D) copolymer, wherein copolymer (D) further comprises an alkylene monomer unit, wherein a content of an α-olefin monomer unit in all alkylene monomers of the copolymer (D) is less than 45 mol %,
   wherein the (C) copolymer is a hydrogenated copolymer primarily comprising a vinyl aromatic monomer unit and a conjugated diene monomer unit; and an average vinyl bond content in all conjugated diene units contained before hydrogenation is 62 mol % or more, and
   wherein a mass ratio ((C)/(D)) of the (C) component to the (D) component is 1/2 or less.

2. The polypropylene-based resin composition according to claim 1, wherein a mass ratio ((C)/(B)) of the (C) component to the (B) component is 1/2 or less.

3. The polypropylene-based resin composition according to claim 1, wherein the (C) component contains at least two or more polymer blocks primarily comprising a vinyl aromatic monomer unit; and an average vinyl bond content in all conjugated diene monomer units contained before hydrogenation is 67 mol % or more.

4. The polypropylene-based resin composition according to claim 3, wherein 75 mol % or more of all unsaturated groups contained in the conjugated diene monomer unit before hydrogenation in the (C) component are hydrogenated.

5. The polypropylene-based resin composition according to claim 1, wherein a peak temperature of tan δ obtained from viscoelastic measurement of the (B) component is in a range of −60° C. or more and −30° C. or less.

6. The polypropylene-based resin composition according to claim 1, wherein the (D) component is a hydrogenated copolymer primarily comprising a vinyl aromatic monomer unit and a conjugated diene monomer unit; and an average vinyl bond content in all conjugated diene monomer units contained before hydrogenation is less than 62 mol %.

7. The polypropylene-based resin composition according to claim 6, wherein a content of an α-olefin monomer unit in all alkylene monomers of the component (D) is 21 mol % or more and less than 45 mol %.

8. The polypropylene-based resin composition according to claim 7, wherein an average vinyl bond content in the conjugated diene monomer unit contained before hydrogenation is from 35 to 60 mol %.

9. The polypropylene-based resin composition according to claim 1, further comprising 5 to 30% by mass of an inorganic filler (E).

10. The polypropylene-based resin composition according to claim 1, wherein the (A) component forms a continuous phase; the (B) component is present as a disperse phase (a first disperse phase) in the continuous phase; and the (C) component and/or the (D) component is dispersed on an interface between the continuous phase and the first disperse phase.

11. A molded article comprising a polypropylene-based resin composition according to claim 1.

12. An automobile interior or exterior material comprising a molded article according to claim 11.

* * * * *